United States Patent [19]

Formanek

[11] Patent Number: 5,179,599
[45] Date of Patent: Jan. 12, 1993

[54] DYNAMIC THRESHOLDING SYSTEM FOR DOCUMENTS USING STRUCTURAL INFORMATION OF THE DOCUMENTS

[75] Inventor: Lynn J. Formanek, Greeley, Colo.

[73] Assignee: Hewlett-Packard Company, Palo Alto, Calif.

[21] Appl. No.: 898,392

[22] Filed: Jun. 11, 1992

Related U.S. Application Data

[63] Continuation of Ser. No. 716,578, Jun. 17, 1991, abandoned.

[51] Int. Cl.[5] ............................................. G06K 9/38
[52] U.S. Cl. ........................................ 382/51; 382/18
[58] Field of Search ................................... 382/18, 51

[56] References Cited

U.S. PATENT DOCUMENTS

| | | | |
|---|---|---|---|
| 4,907,286 | 3/1990 | Yamada | 382/51 |
| 4,977,605 | 12/1990 | Fardeau et al. | 382/51 |
| 5,038,381 | 8/1991 | Nelson | 382/18 |

OTHER PUBLICATIONS

White, J. M. and Rohrer, G. D., "Image Thresholding for Optical Character Recognition and Other Applications Requiring Character Image Extraction", *IBM J. Res. Develop.*, vol. 27, No. 4, Jul. 1983.

Kittler, J. et al., "An Automatic Thresholding Algorithm and its Performance", International Conference on Pattern Recognition, pp. 287-289, 1984.

Kapur et al., "A New Method for Gray-Level Picture Thresholding Using the Entropy of the Histogram", *Computer Vision, Graphics, and Image Processing*, vol. 29, pp. 273-285, 1985.

Silver, W. M., "Gray-Level Processing in Machine Vision", *ESD: The Electronic System Design Magazine*, pp. 79-83, May 1987.

Primary Examiner—David K. Moore
Assistant Examiner—Barry Stellrecht

[57] ABSTRACT

Disclosed is a system that converts a scanned image of a complex document, wherein each pixel is represented by a gray scale level, into a bi-level image where text has been preserved and separated from the background. The system subdivides the scanned image into cells, and then creates histograms of the gray scale levels of the pixels in the cells. It creates matrices of the runs of dark pixels within the cells, and examines the runs to determine the extent of connected components. It computes the percentage of runs of each length, and computes the average gray scale level of runs of each length for the document image. It determines peaks in each of the histograms, and determines the width of the first peak within each histogram. The system uses this information to set a gray scale level threshold used to create the bi-level image.

11 Claims, 13 Drawing Sheets ns of the invention.

DYNAMIC THRESHOLDING SYSTEM FOR DOCUMENTS USING STRUCTURAL INFORMATION OF THE DOCUMENTS

CROSS REFERENCE TO RELATED APPLICATION

This is a continuation of copending application Ser. No. 07/716,578 filed on Jun. 17, 1991, now abandoned.

FIELD OF THE INVENTION

This invention relates to computer systems and more particularly to document scanners within such systems. Even more particularly, the invention relates to extracting the text from a scanned image of a document.

BACKGROUND OF THE INVENTION

Optical character recognition, or OCR, is the process of transforming a graphical bit image of a page of textual information into a text file wherein the text information is stored in a common computer processable format, such as ASCII. The text file can then be edited using standard word processing software.

When a document is being scanned, the brightness of each dot, or pixel, within the image of the document is stored as a code that represents the tonal range of the pixel. When using a monochromatic scanner, the tonal range varies from pure black to pure white along a gray scale. The code, or gray scale level, is typically four bits, giving a tonal range of 0 to 15, where 0 or 15 is typically pure black and 15 or 0 is typically pure white. Since each pixel is stored as a gray scale level, the scanner must determine the threshold gray scale level that separates textual information, which is typically toward the black end of the gray scale, from background information, which is typically toward the white end of the gray scale.

Prior art devices have created a histogram of the gray scale levels of the pixels within a document, and used peaks found in the histogram to perform the separation. This method works well with simple documents, which typically have black text printed on a white background. Scanning this type of document results in a histogram having two peaks, one representing the text at one end of the gray scale, and one representing the background at the other end of the gray scale.

When the document is more complex, however, this method breaks down. For example if part of the document has dark text on a light background, and part of the document has dark text on a colored background, the histogram may have three peaks, with the middle peak representing the colored background. Alternatively, if the document has dark text on a light background, and also has lighter text on a light background, the document will also have three peaks, with the middle peak representing the lighter text, not background.

A third situation occurs when the text is formed of characters with very thin lines. In this instance, only one peak may occur in the histogram, and this peak will represent the background color only.

There is a need in the art then for a scanning system that can separate text from background in complex documents. There is further need for such a system that can separate text printed on two or more background colors. A still further need is for such a system that will separate text formed from thin lines. The present invention meets these needs.

SUMMARY OF THE INVENTION

It is an aspect of the present invention to provide a system for separating text information from background information in a scanned image of a document.

It is another aspect of the invention to subdivide the image into cells and perform such separation on each cell.

Another aspect is to separate text on documents having characters with thin lines.

A further aspect of the invention is to perform such separation using a histogram of the cell.

A still further aspect of the invention is to perform such separation by determining the number of runs of dark pixels within each cell.

The above and other aspects of the invention are accomplished in a system that converts a scanned image of a complex document, wherein each pixel is represented by a gray scale level, into a bi-level image where text has been preserved and separated from the background. The system first subdivides the scanned image into cells, for example, a square cell of 64 pixels on each side. Every other pixel of every other line of each cell is then examined and a histogram is constructed of the gray scale levels of these pixels. A matrix is then constructed of the vertical runs of dark pixels within each cell of the image. Horizontal runs are examined to determine the extent of connected components. The system computes the percentage of runs of each length, and computes the average gray scale level of runs of each length. The system further determines peaks in each histogram, and determines the width of the first peak within each histogram.

After extracting all these features, the system examines the features to set the threshold gray scale level to be used in rescanning the document to separate text from background. If the histogram has a single peak, the threshold is set above or below the peak, depending upon the gray scale level of the peak.

If the histogram has two peaks, and the foreground, also called the text, peak is light, the threshold is set to exclude both the foreground and background. If the background peak is dark, the threshold is set between the background and foreground peaks. If the background is white, and the current cell background is white and the background variation is relatively small and the current cell's background variation is small, and the total number of runs is large, the threshold is set based upon the number of one two and three pixel runs.

If the histogram has three peaks, the middle peak is compared to the neighboring cells to set the threshold. If the histogram has more than three peaks, the threshold is set to the average of the neighboring cell peaks.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
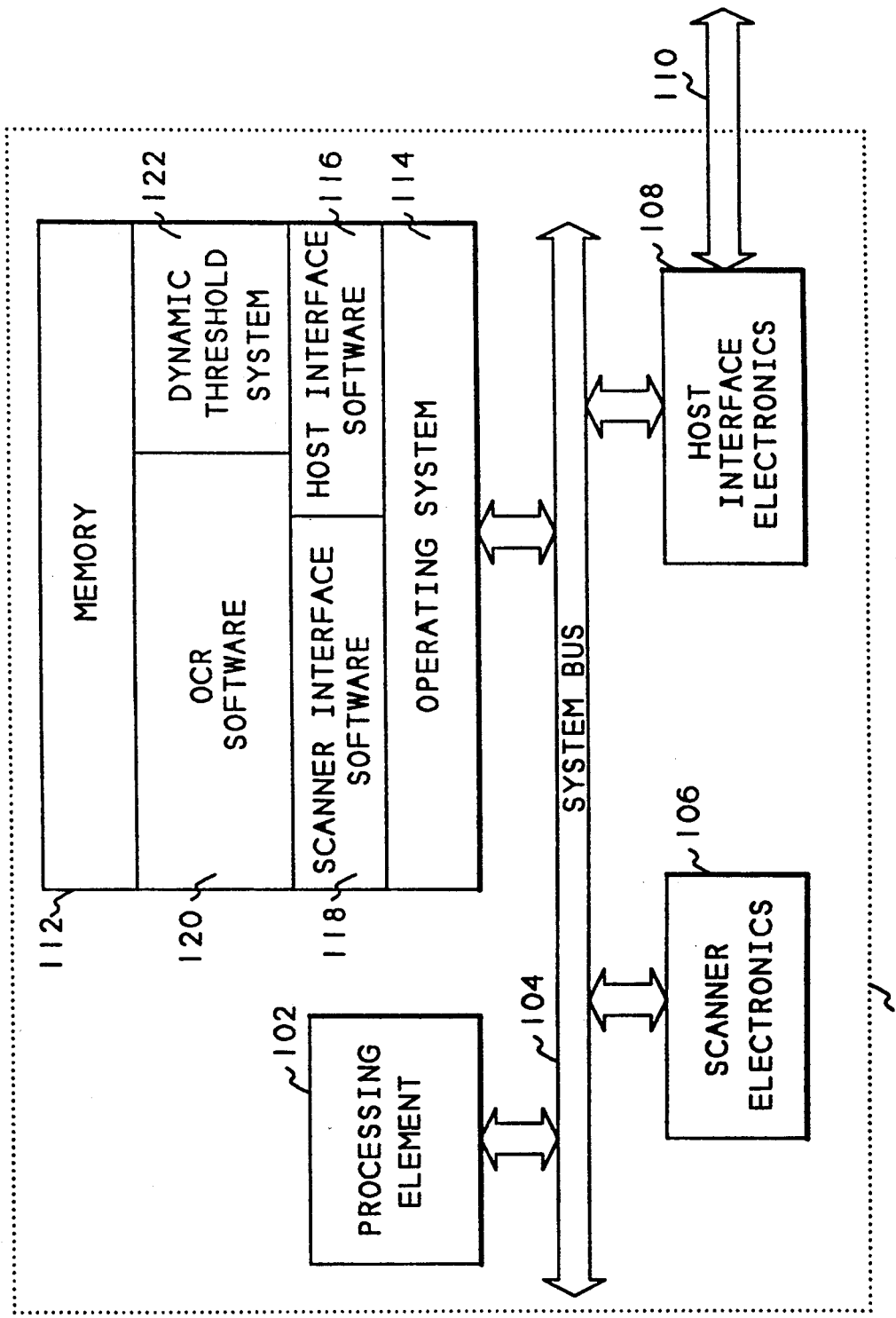
FIG. 1 shows a block diagram of a scanner device incorporating the present invention.

FIG. 1 shows a block diagram of a scanner device incorporating the present invention. Referring now to FIG. 1, a scanner device 100 contains a processing element 102 which communicates to other elements of the scanner 100 over a system bus 104. Scanner electronics 106 scan a document and produce a gray scale level for each pixel scanned. In the present invention the gray scale level consists of 16 possible levels with 15 being pure black and zero being pure white. The invention is not limited to 16 gray scale levels, since it can be used with a system having any number of gray scale levels representing each pixel. The invention may also use a gray scale where the lowest value is pure black and the highest value is pure white. Host interface electronics 108 communicate to a host computer system (not shown), over a host system bus 110. A memory 112 contains the software within the scanner, including the software of the present invention. Within the memory 112, an operating system 114 provides the lowest level software interface to the scanner electronics 106 and the host interface electronics 108. Scanner interface software 118 provides the next level of interface to the scanner electronics 106, and the OCR software 120 and dynamic threshold system 122 of the present invention provide the highest level interface to the scanner electronics 106. Host software interface 116 provides the software necessary to communicate to the host computer system (not shown) through the operating system 114 and the host interface electronics 108.

The scanner 100 containing the present invention is designed to electronically scan a document to produce a bit image of each pixel on the document, and then convert the text contained on the document into a computer readable form. The OCR software 120 is designed to convert the scanned image of text into the computer readable form of the text, however, before the OCR software 120 can perform this conversion the image must first be separated into text and background. The separation of the image into text and background information is the function of the dynamic threshold system 122 of the present invention.

Figure 2:
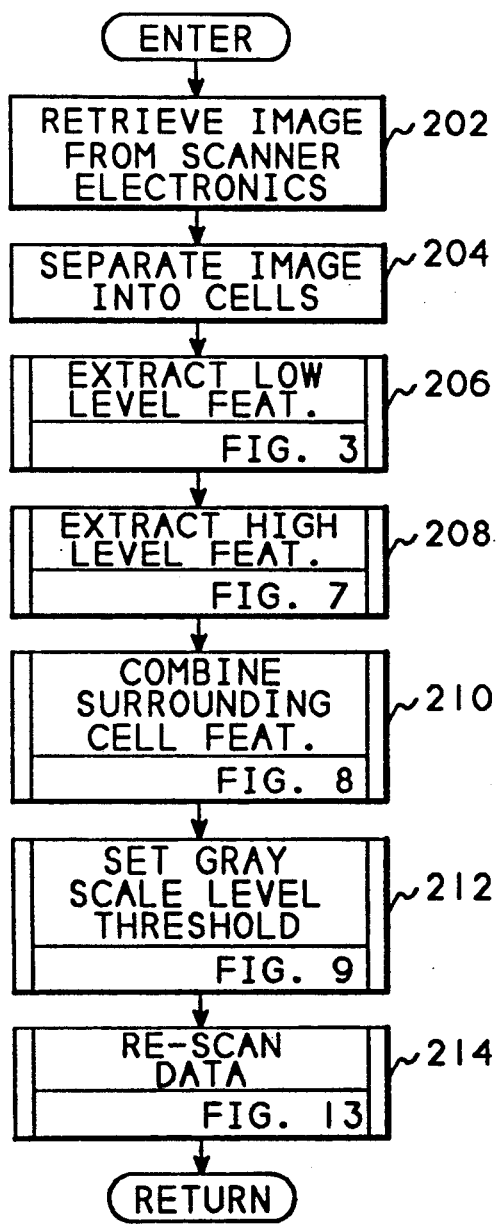
FIG. 2 shows a flowchart of the top level of the software of the present invention.

FIG. 2 shows a flow chart of the top level software of the dynamic threshold system 122 (FIG. 1) of the present invention. This flow chart would be called by the OCR software 120 (FIG. 1). Referring now to FIG. 2, after entry, block 202 retrieves the scanned page image by calling the scanner interface software 118 (FIG. 1) which in turn calls the operating system 114 which interfaces to the scanner electronics 106. In the preferred embodiment of the invention the document will be scanned at a resolution of 300 dots or pixels per inch, and each pixel will be represented by a 4 bit gray scale level having values from zero to 15. After obtaining the page image, block 204 separates the image into cells of 64 pixels square. Although the preferred embodiment of the present invention uses cells of 64 pixels square, the invention is not so limited and could use cells of any size. Block 206 then calls FIG. 3 to extract low level features from each of the cells. Low level features include a histogram of the gray scale levels within the cell, run lengths of all runs of dark pixels within the cells, and an array showing connected components. Block 208 then calls FIG. 7 to extract high level features from the document image. High level features include the percentage of runs of each length within the cell, the average gray scale level of runs of each length, peaks in the histogram for each cell, the width of the first peak in the histogram for each cell, and the minimum gray scale value between the first two peaks in the histogram. Block 210 then calls FIG. 8 to combine statistics from surrounding cells for each of the cells of the document image. Block 212 then calls FIG. 9 to set the gray scale level threshold in order to separate text from background within the document. After the threshold is set, block 214 calls FIG. 13 to re-scan the page image data using the new threshold in order to perform the separation of text and background. After separating the text and background, FIG. 2 then returns to the OCR software 120 (FIG. 1).

Figure 3:
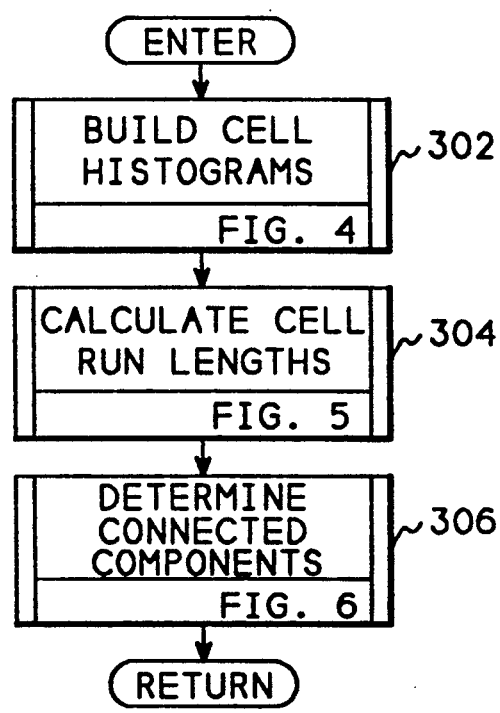
FIG. 3 shows a flowchart of the extract low level features software module within the invention.

FIG. 3 shows a flow chart of the extract low level features software module within the invention. Referring now to FIG. 3, after entry, block 302 calls FIG. 4 to build histograms for each of the cells separated by FIG. 2. Block 304 then calls FIG. 5 to calculate the length of runs of dark pixels within each of the cells, and block 306 calls FIG. 6 to determine the connected components contained within each of the cells. After the low level features have been extracted, FIG. 3 returns to FIG. 2.

Figure 4:
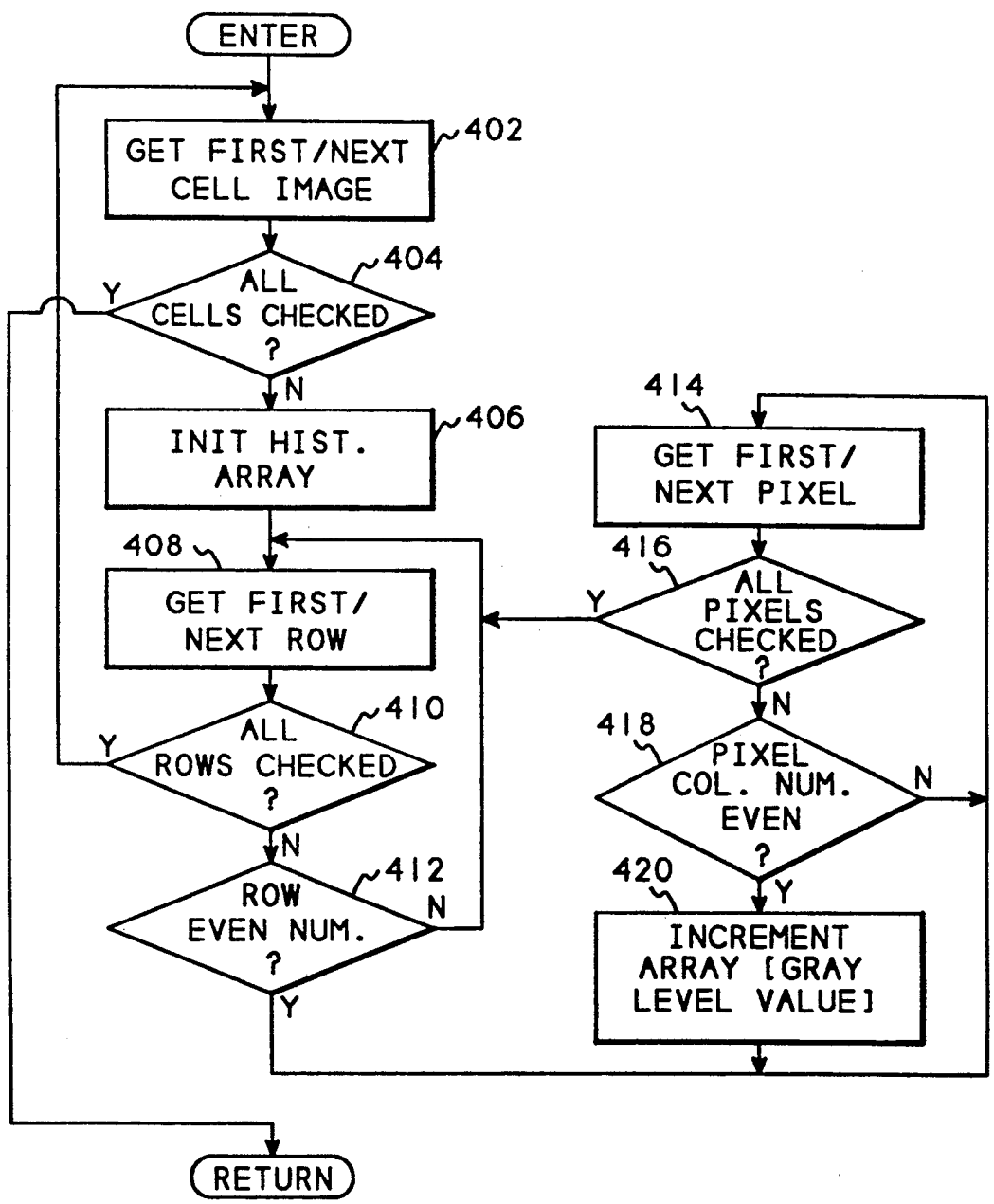
FIG. 4 shows a flowchart of the compute histogram software module.

FIG. 4 shows a flow chart of the build cell histograms software module called from FIG. 3. Referring now to FIG. 4, after entry, block 402 gets the first or next cell image and then block 404 determines whether all the cells have been processed. If cells remain to be processed, block 404 transfers to block 406 which initializes a histogram array and then block 408 gets the first or next row of pixels within the cell. Block 410 determines if all rows have been checked and if not, transfers to block 412 which determines whether the row obtained is an even numbered row. In order to improve performance in the preferred embodiment, the histogram is created by scanning every other row within the cell. Those skilled in the art would recognize that each row within the cell could be scanned and also that the odd numbered rows could be scanned. If this is not an even numbered row, block 412 transfers back to block 408 to get the next row. If the row is an even numbered row block 412 transfers to block 414 which gets the first or next pixel within the row. Block 416 then determines whether any pixels remain to be checked and if there are pixels remaining to be checked, block 416 transfers to block 418 which determines whether the pixel column number is an even number. The invention also only builds a histogram using every other pixel within the cell, however, those skilled in the art will recognize that every pixel could be scanned to build the histogram and also the software could scan odd pixels. If the pixel is an even number, block 418 transfers to block 420 which increments a value within the histogram array at the gray scale level value of the pixel just retrieved.

In the above described manner every other pixel of every other row is scanned to build a histogram of the gray scale level values within the cell. After the desired pixels within the desired rows of a cell have been scanned, block 410 transfers back to block 402 which processes the next cell within the image. After all cells within the image have been processed, block 404 returns to FIG. 3.

Figure 5:
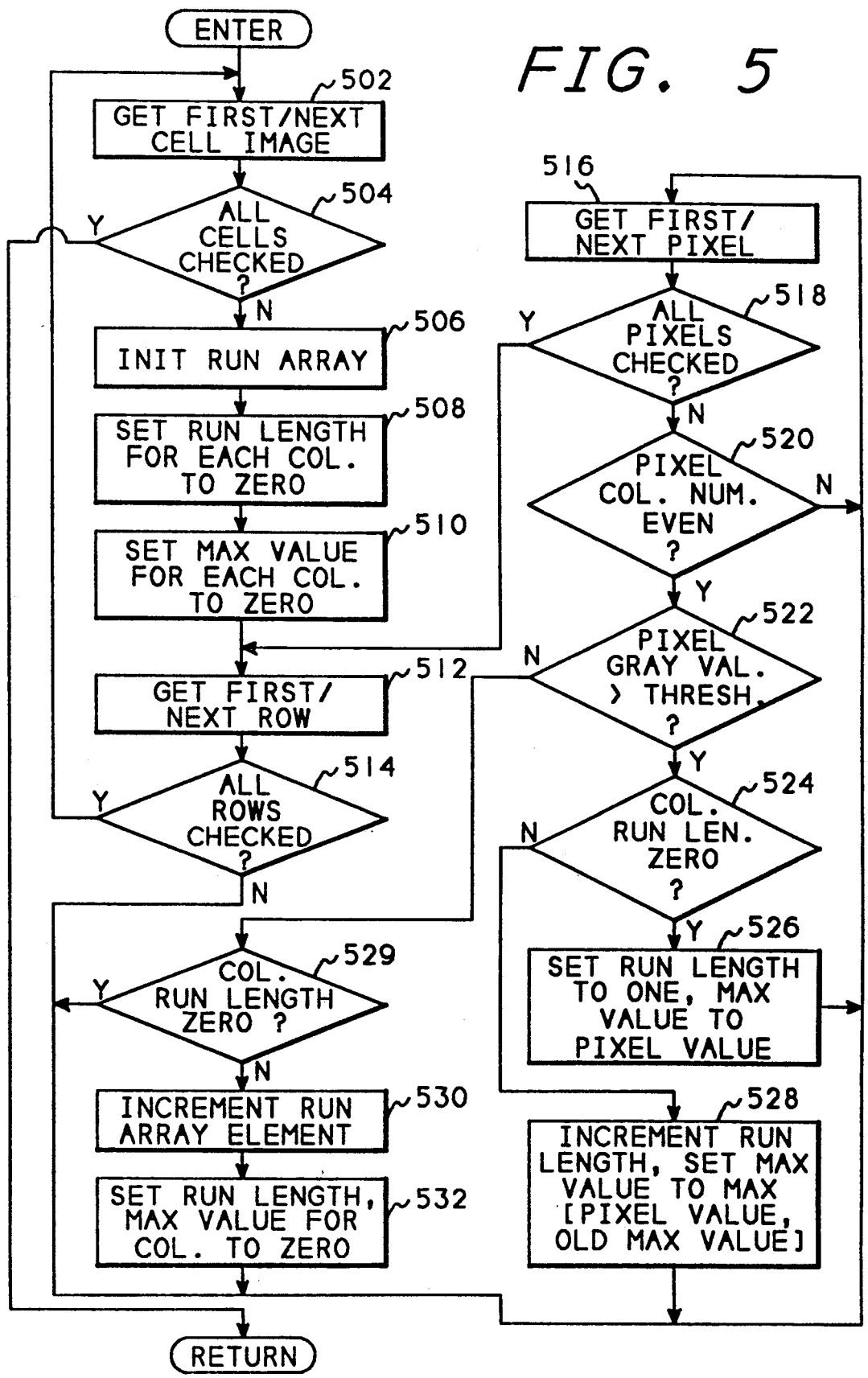
FIG. 5 shows a flowchart of the compute run lengths software module.

FIG. 5 shows a flow chart of the compute run lengths software module called from FIG. 3. In the preferred embodiment, runs are calculated for the vertical columns of the cell. Those skilled in the art will recognize that runs could also be calculated for rows or for both rows and columns.

Referring now to FIG. 5, after entry, block 502 gets the image from the first or next cell and then block 504 determines if all cells have been checked. If cells remain to be checked and an image was available, block 504 transfers to block 506 which initializes the run array. This is a two dimensional array having gray scale levels as one dimension and run lengths as the other dimension. Block 508 then sets the run length for each column within the cell to zero and block 510 sets the maximum gray scale value for each column within the cell to zero. These two variables are needed since the cell is scanned row by row. If the cell were being scanned column by column these would not be needed. Block 512 then gets the first or next row within the cell and block 514 determines if all rows have been checked. If a row remains to be checked, block 514 transfers to block 516 which gets the first or next pixel within the row and block 518 determines whether all pixels have been checked. If a pixel remains to be checked, block 518 transfers to block 520 which determines whether the pixel column number is an even number. To improve overall performance, the run lengths are only checked for every other column. Those skilled in the art will recognize that pixels could be checked for every column, or that pixels for the odd numbered column would produce essentially the same results as for the even numbered columns. If the pixel is for an even numbered column, block 520 transfers to block 522 which determines whether the pixel gray scale value is greater than a run separation threshold. In order to determine that a run of dark pixels exist, some threshold needs to be determined that is dark enough to constitute a dark pixel. The present invention assumes that text will normally be on a very light or white background, and that a run separation threshold value, as defined in table 1, is the minimum level to constitute a dark pixel and therefore become part of a run. If the pixel is not greater than the run separation threshold value, then the end of a run has been detected so block 522 transfers to block 529 which determines if a run has been detected. If no run has been detected, block 529 transfers back to block 516. If a run was previously detected, it is now terminated so block 529 transfers to block 530 which increments the run array element corresponding to the maximum gray scale level of the run and the length of the run. Then block 532 sets the run length and maximum values for this column back to zero and transfers back to block 516 to get the next pixel within the row.

If the pixel is greater than the run separation threshold value, block 522 transfers to block 524 which determines whether the column run length is currently zero. If the column run length is currently zero, block 524 transfers to block 526 which sets the run length to one, indicating the start of a run, and then sets the maximum gray scale value for the run to value of this pixel. Block 526 then returns to block 516 to get the next pixel in the row. If the column run length is not zero, indicating that a run has already been detected, block 524 transfers to block 528 which increments the run length by one, and sets the maximum gray scale value to the highest of the pixel value or the old maximum value. Block 528 then returns to block 516 to get the next pixel.

In the manner described above, all runs of dark pixels within the cell are analyzed. After all pixels within a row have been checked, block 518 transfers to block 512 to get the next row within the cell and after all rows within a cell have been checked, block 514 transfers back to block 502 to process the next cell within the image. After all cells within the image have been processed, block 504 returns to FIG. 3.

Figure 6:
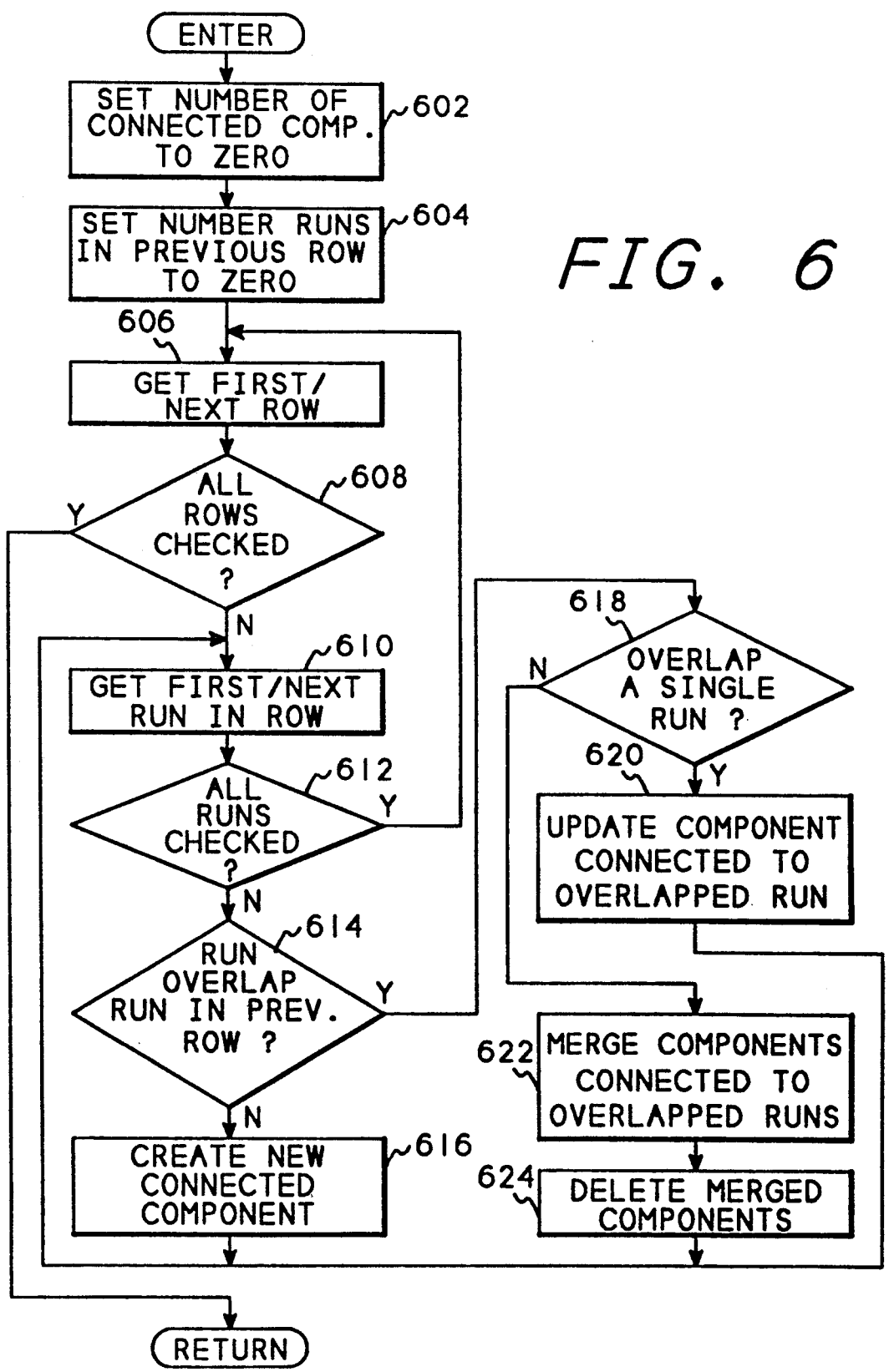
FIG. 6 shows a flowchart of the compute connected components software module.

FIG. 6 shows a flow chart of the compute connected components software module called from FIG. 3. This module extracts horizontal runs and combines these runs into the components represented by the runs. The entire document image is examined row by row, ignoring cell boundaries, and statistics are kept for each component including the bounding box of the components, the number of runs in the components, the number of dark pixels in the component, and the number of holes within the component. Those skilled in the art will recognize that the document could be scanned column by column in the same manner described above with respect to FIG. 5.

Referring now to FIG. 6, after entry, block 602 sets the number of connected components to zero. Block 604 then sets the number of runs detected in the previous row to zero. Block 606 gets the first or next row and block 608 determines if all rows have been checked. If one or more rows remains to be checked, block 608 transfers to block 610 which gets the first or next run within the row and block 612 determines whether all runs within the row have been checked. If one or more runs remains to be examined, block 612 transfers to block 614 which determines whether this run overlaps a run from the previous row. If the run does not overlap a run from the previous row, block 614 transfers to block 616 which creates a new component before transferring back to block 610 to get the next run in the row. If the run does overlap a run from a previous row, block 614 transfers to block 618 which determines whether the current run overlaps only a single run in the previous row. If an overlap occurs with only a single run from the previous row, block 618 transfers to block 620 which updates the statistics for the component connected to the overlapped run. If the run overlaps more than one run from a previous row, block 618 transfers to block 622 which merges components connected to the overlapped runs. That is, the current run being examined may be the connecting link between two or more previously independent components. If this is the case, block 622 will merge these components since they are part of a larger single component. Block 624 then deletes the components that were merged before returning to block 610 to get the next run in the row.

After all runs in the column have been checked, block 612 transfers back to block 606 to get the next row.

After all rows have been checked, block 608 returns to FIG. 3.

Figure 7:
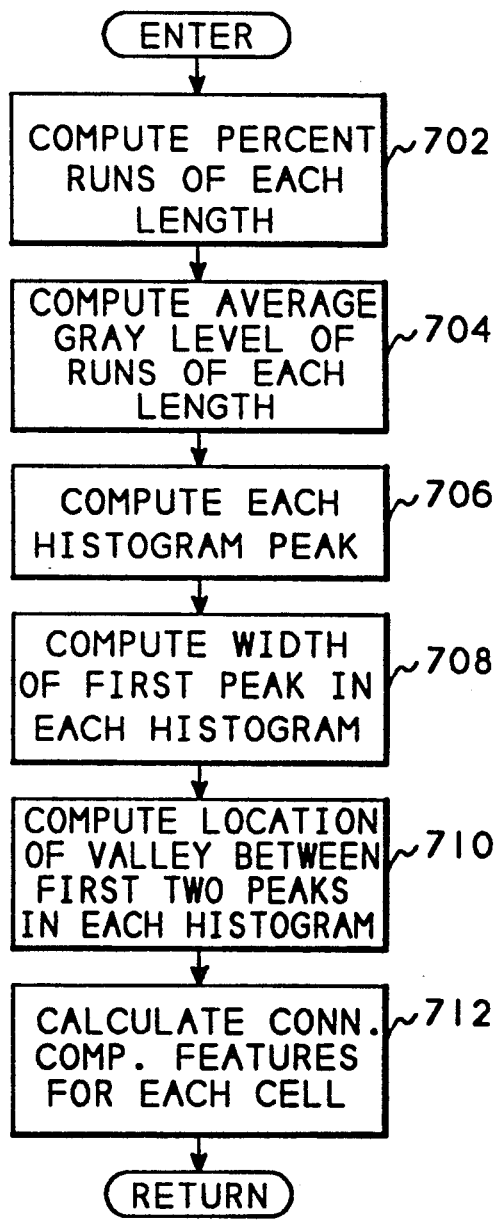
FIG. 7 shows a flowchart of the extract high level features software module.

FIG. 7 shows a flow chart of the extract high level feature software module called from FIG. 2. Referring now to FIG. 7, after entry, block 702 computes the percentage of runs of each length within the document image. Using the information obtained in FIG. 5, block 702 computes the percentage of runs having a length of 1 pixel, the percentage of overall runs having a length of 2 pixels, etc. Block 704 then computes the average gray scale level of the runs of each length. Block 706 then determines each peak within each histogram for the cells, and block 708 computes the width of the first peak in the histogram for each of the cells. Since the first peak in the histogram represents the background information, the width of the first peak determines the background variation of the cell. Block 710 then computes the location of the valley between the first two peaks in each of the histograms for the cells. Block 712 calculates connected component statistics for each cell by determining the probability that the cell contains text and the probability that the cell contains merged text. The probability that the cell contains text is determined by the low level features of the connected components such a width and height of the component, the number of holes and the complexity of the component. The probability of having merged characters is determined by the ratio of width to height of the components and the complexity of the components. After calculating these statistics, FIG. 7 returns to FIG. 2.

Figure 8:
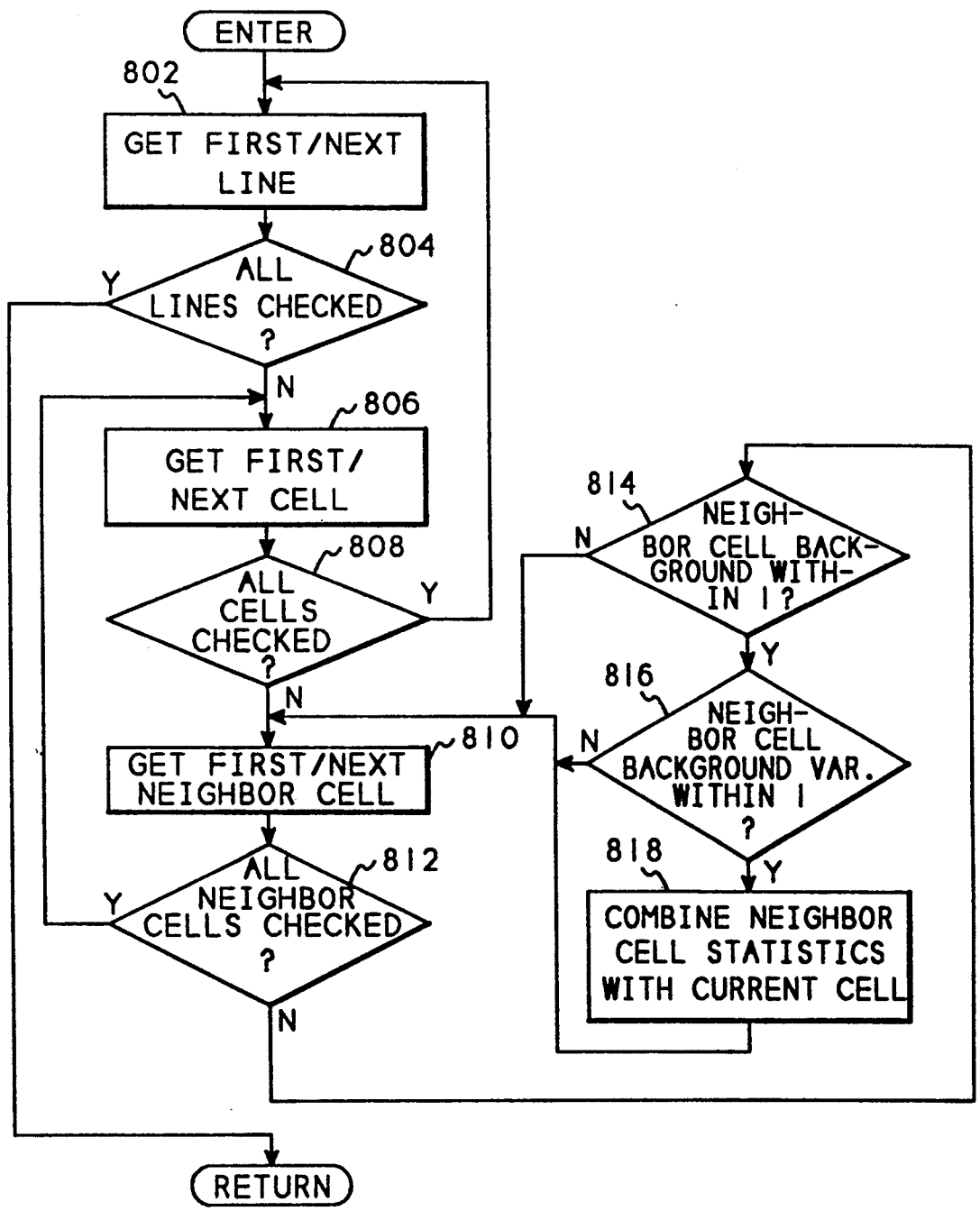
FIG. 8 shows a flowchart of the software module for combining features from neighboring cells.
Figure 9:
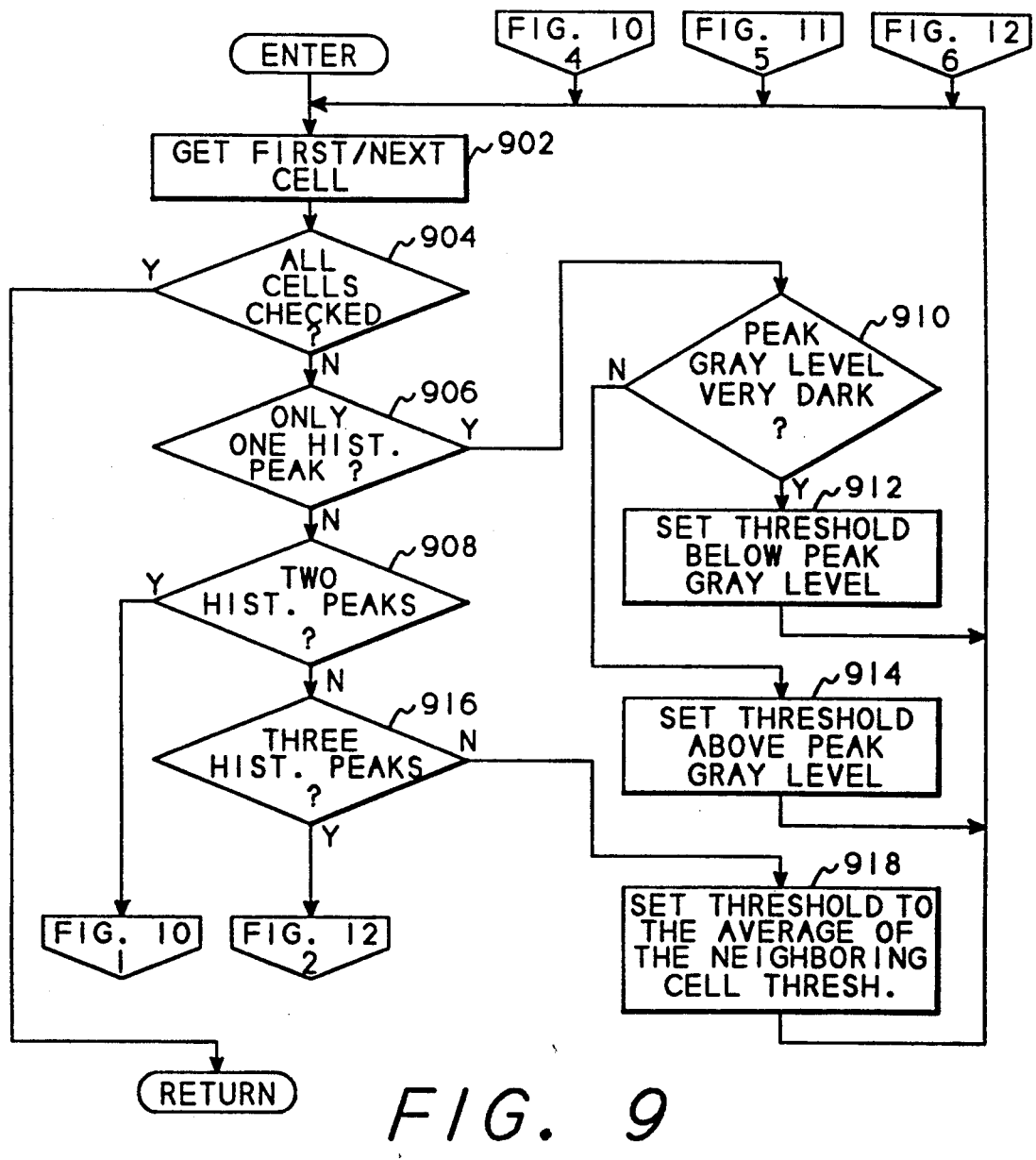
FIGS. 9 through 12 show a flowchart of the calculate threshold software module.
Figure 10:
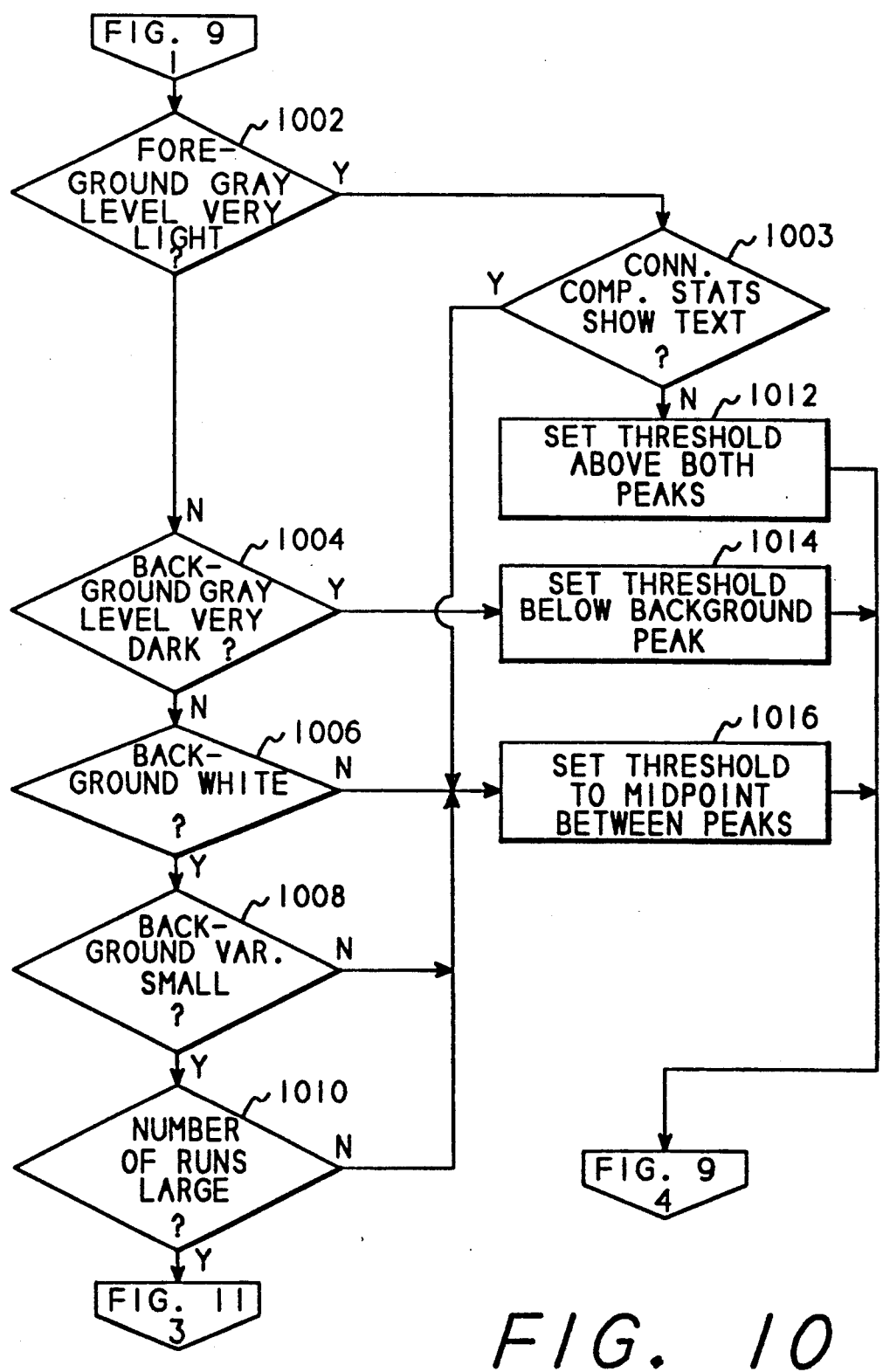
Figure 11:
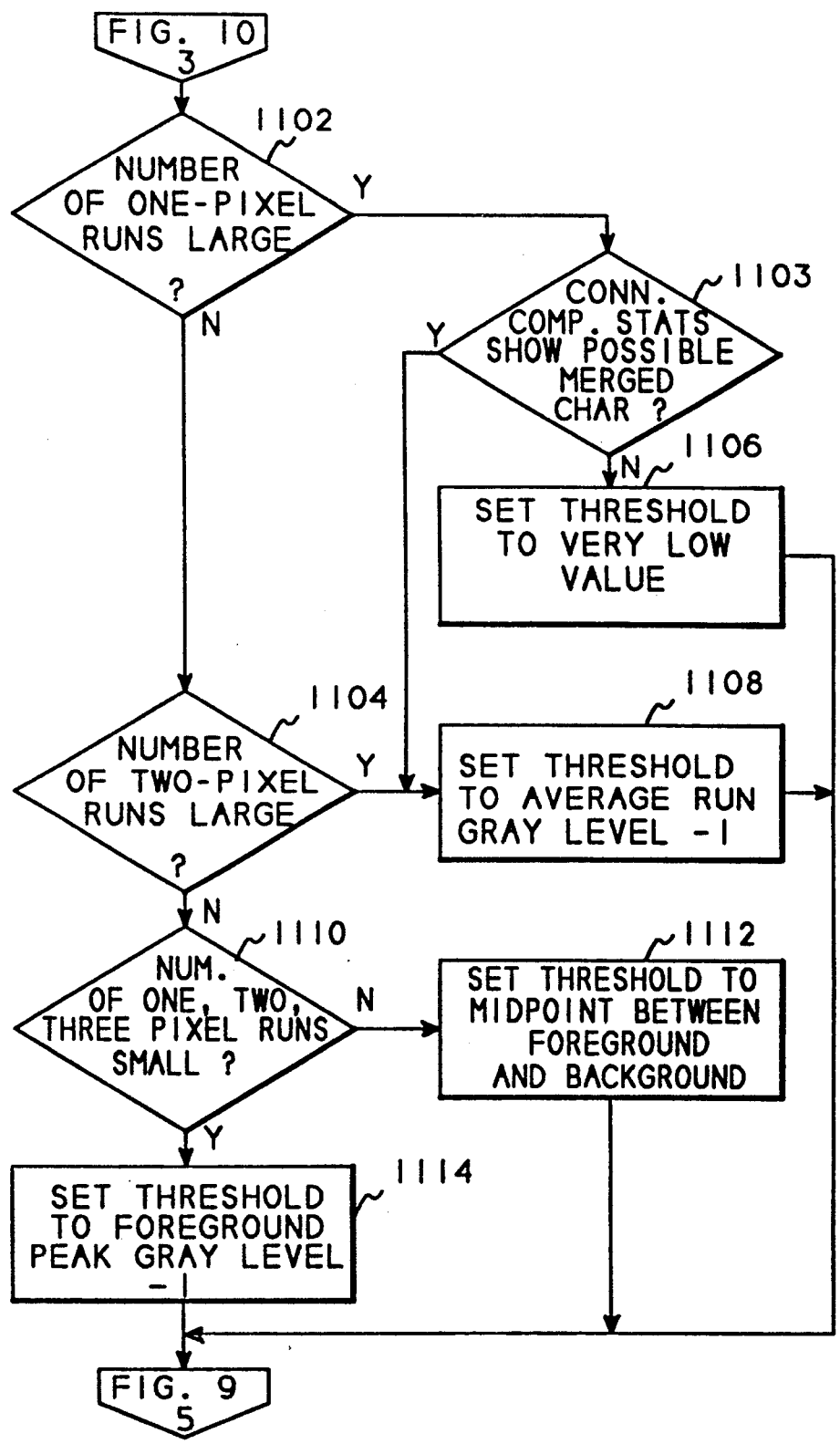

FIG. 8 shows a flow chart of the software module called from FIG. 2 for combining features from neighboring cells. Using data from surrounding cells is very important in creating a robust system. By combining the data from surrounding cells, the system reduces the effects of noise. This combination also increases the confidence of measurements taken for each cell. FIG. 8 examines the 24 nearest neighbors of a cell and compares the gray scale level histogram of each of these neighboring cells with the current cell. If the neighbor cell has approximately the same background peak gray scale level and the variation of the backgrounds are about equal, its statistics are averaged into the current cell statistics.

Referring now to FIG. 8, after entry, block 802 gets the first or next cell line within the image, and block 804 determines whether all lines within the image have been examined. If a line remains to be examined, block 804 transfers to block 806 which gets the first or next cell within the line. Block 808 then determines if all cells have been examined and if not, block 808 transfers to block 810 which gets the first or next neighbor cell in proximity to the cell obtained in block 806. The neighbors cells are the two cells adjacent in each direction, including diagonal directions, from the cell obtained in block 806. That is, the cell obtained in block 806 is the center of a 5 by 5 matrix of cells, and the remaining 24 cells of the matrix are considered to be neighbors. Near the edges of pages, the matrix is effectively shifted so that the 5 by 5 matrix stays on the page. After obtaining the first or next neighbor cell, block 810 transfers to block 812 which determines whether all neighboring cells have been examined and if one or more neighboring cell remains to be examined, block 812 transfers to block 814. Block 814 determines whether the neighbor cell has a background peak in its histogram within one gray scale level of the background peak of the current cell. If this is true, block 814 transfers to block 816 which determines whether the neighbor cell's background variation is within one of the current cell's background variation. If this is also true, block 816 transfers to block 818 which combines the statistics from the neighboring cells into the current cell's statistics. If block 814 was false, or block 816 was false, or after combining statistics, control transfers back to block 818 to get the next neighbor cell. After all neighbor cells have been examined, block 812 transfers back to block 806 to obtain the next cell within the line. After all cells within the line have been examined, block 808 transfers back to block 802 to obtain the next line, and after all lines of cells within the image have been examined, block 804 returns to FIG. 2.

FIGS. 9 through 12 show a flow chart of the calculate threshold software module called from FIG. 2. This module primarily examines the histogram created by FIG. 4 and secondarily examines the other statistics to determine the proper setting for the threshold that will best separate the text from the background of the document image. Referring now to FIGS. 9 through 12, after entry, block 902 gets the first or next cell from the image and block 904 determines whether the threshold has been set for all cells. If cells remain to be examined, block 904 transfers to block 906 which determines whether a single histogram peak exists within the histogram for the cell. If only a single peak exists, block 906 transfers to block 910 which determines whether the gray scale level of the peak is greater than or equal to the Dark Level threshold shown in Table 1. If the peak is greater than or equal to this threshold, block 910 transfers to block 912 which sets the threshold below this peak grey level value to exclude this peak from the scanned data. If block 910 determines that the grey level value of the peak is less than the Dark Level threshold, block 910 transfers to block 914 which sets the threshold above the grey level of the peak to include this peak, assuming that the peak represents the text information. After setting the threshold, either by block 912 or block 914, control returns to block 902 to examine the next cell. If the cell contains more than one peak in its histogram, block 906 transfers to block 908 which determines whether the histogram for the cell contains two peaks. If the histogram does contain two peaks, block 908 transfers to FIG. 10 block 1002. If the histogram contains two peaks, the higher gray scale numbered peak is considered to be the foreground, and the lower gray scale numbered peak is considered to be the background. Block 1002 examines the foreground peak grey level to determine if this peak is less than or equal to the Light Level threshold shown in Table 1. If the foreground is less than or equal to this threshold, control transfers to block 1003 which determines whether the connected component statistics determined in block 712 (FIG. 7) indicate the possibility that the components are text. If the components do appear to be text, block 1003 transfers to block 1014, otherwise block 1003 transfers to block 1012 which sets the threshold above both peaks to ignore both the foreground and background information in the cell. After setting the threshold block 1012 transfers control to FIG. 9 block 902.

If the foreground level is not light, block 1002 transfers to block 1004 which determines whether the background peak gray scale level is greater than or equal to the Dark Level threshold shown in Table 1. If the background peak is greater than or equal to the Dark Level threshold shown in Table 1, block 1004 transfers to block 1014 which sets the threshold below the background peak, and below the foreground peak, to ignore the background and the foreground. Block 1014 then transfers back to FIG. 9 block 902.

If the background gray scale level is less than the Dark Level threshold, block 1004 transfers to block 1006 which determines whether the background is a white level. If the background is white, block 1006 transfers to block 1008 which determines whether the variation in the background is less than or equal to the Background Variation threshold shown in Table 2. If the background variation is small, block 1008 transfers to block 1010 which determines whether the number of runs is greater than or equal to the Number of Runs threshold sown in Table 2, as defined by Table 2. If any of the tests for block 1006, block 1008, or block 1010 is not true, control transfers to block 1016 which sets the threshold to the midpoint between the two peaks before returning to FIG. 9 block 902.

If all the tests of block 1006, 1008, and 1010 are true, the cell has a very clean white background cell with very distinguishable text. Therefore, control transfers to FIG. 11 block 1102 which determines whether the number of one pixel runs is greater than or equal to the Number of One Pixel Runs threshold shown in Table 2 and if it is, then the document contains very thin strokes so block 1102 transfers to block 1103 which determines, based on the connected component statistics calculated in block 712 (FIG. 7), whether there is a possibility of merged characters. If there is a possibility of merged characters, block 1103 transfers to block 1108, otherwise block 1103 transfers to block 1106 which sets the threshold to a very low value to broaden the text information when it is scanned. Block 1106 then returns to FIG. 9 block 902.

If the number of one pixel runs is not large, block 1102 transfers to block 1104 which determines whether the number of 2 pixel runs is greater than or equal to the Number of Two Pixel Runs threshold shown in Table 2. If this true, block 1104 transfers to block 1108 which sets the threshold to the average run gray level minus one before returning to FIG. 9 block 902. If the number of two pixel runs is not greater than or equal to the Number of Two Pixel Runs threshold shown in Table 2, block 1104 transfers to block 1110 which determines if the number of one, two, and three pixel runs is small. If so, block 1110 transfers to block 1114 which sets the threshold to the foreground peak grey level minus one before returning to FIG. 9 block 902. If the number of one, two, and three pixel runs is not small, block 1110 transfers to block 1112 which sets the threshold to the midpoint between the background and foreground and then returns to FIG. 9 block 902.

Figure 12:
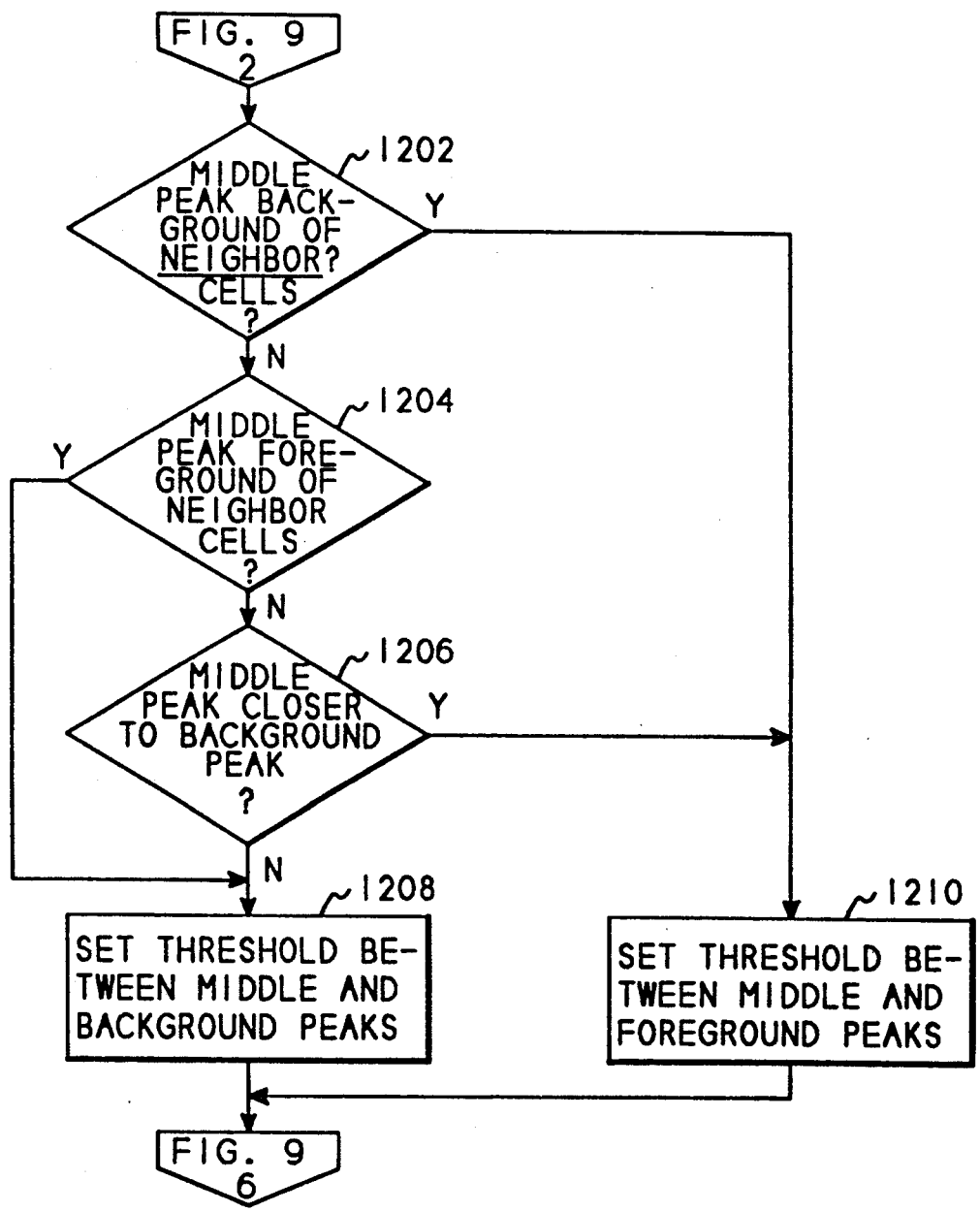

If the histogram of the cell contains 3 peaks, block 916 transfers to FIG. 12 block 1202. Block 1202 then examines the neighbor cells to the current cell to determine if the middle peak gray scale value is within one gray scale number as the background peak in the neighboring cells. If this is true, then the middle peak probably represents background information so block 1202 transfers to block 1210 which sets the threshold between the middle and foreground peaks, to exclude the middle peak from the text information. If the middle peak is not a background peak of neighboring cells, block 1202 transfers to block 1204 which determines whether the middle peak is within one gray scale number of the foreground peak of neighbor cells. If this is true, then the middle peak probably represents text information, so block 1204 transfers to block 1208 which sets the threshold between the middle and background peaks to include the middle peak in the text information.

If the middle peak gray scale value is not the same as the foreground peak in neighboring cells, block 1204 transfers to block 1206 which determines whether the middle peak is closer to the background peak. If this is true, the middle peak probably represents background so, block 1206 transfers to block 1210 which sets the threshold between the middle and foreground peaks. If this is not true, the middle peak probably represents text, so block 1206 transfers to block 1208 which sets the threshold between the middle and background peaks before returning to FIG. 9 block 902.

If the histogram contains more than three peaks, block 916 transfers to block 918 which sets the threshold to the average of the neighboring cell thresholds.

After the threshold has been set in all cells, block 904 returns to FIG. 2.

Figure 13:
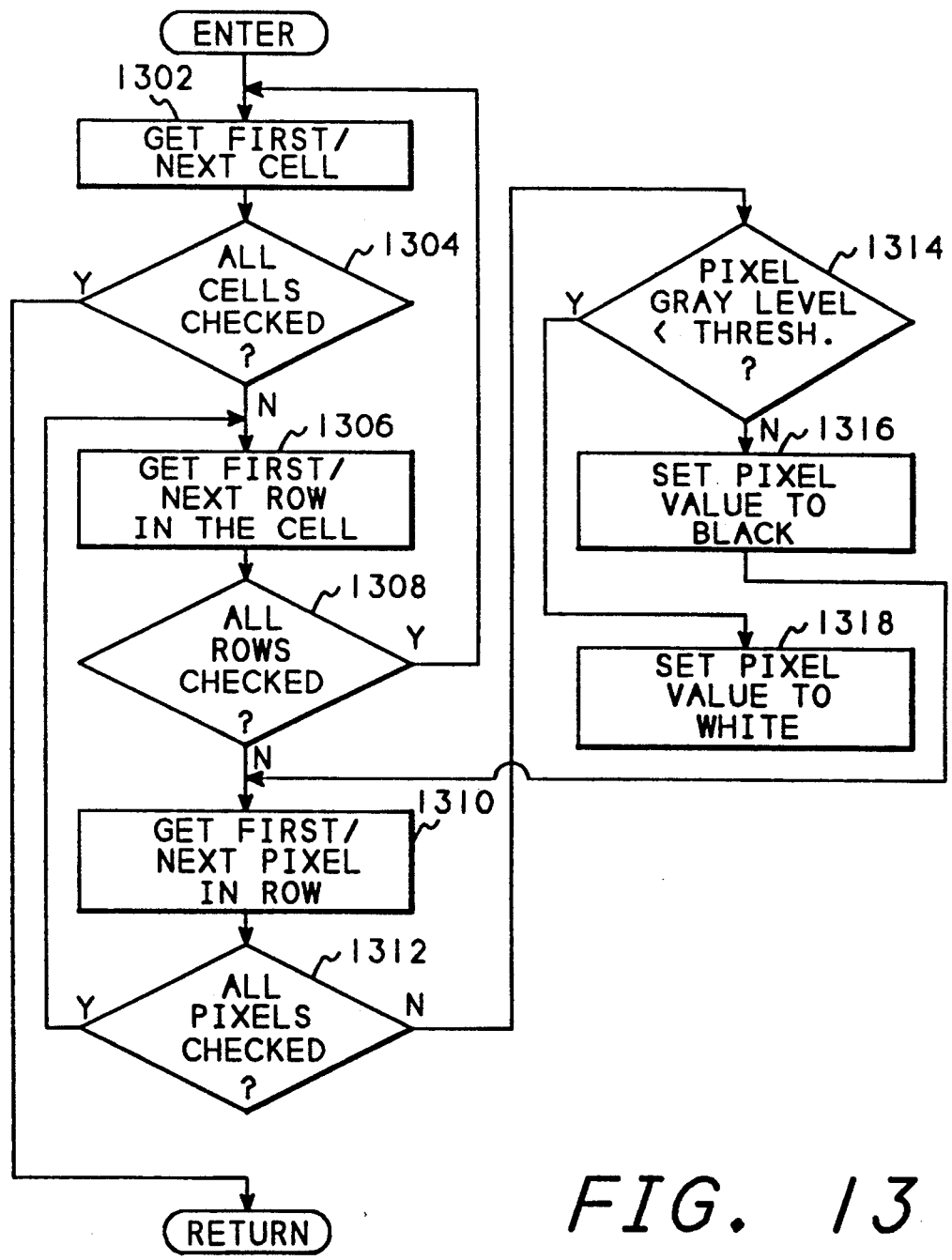
FIG. 13 shows a flowchart of the re-scan software module of the invention.

FIG. 13 shows a flow chart of the re-scan software module of the invention. The software module of FIG. 13 re-scans the document using the threshold for each cell determined by FIGS. 9 through 12. In the preferred embodiment this re-scan is done by reprocessing the data in a memory buffer. Referring now to FIG. 13, after entry, block 1302 gets the first or next cell and block 1304 determines if all cells have been examined. If cells remain to be examined, block 1304 transfers to block 1306 which gets the first or next row within the cell and block 1308 determines whether all rows within the cell have been examined. If one or more rows remain to be examined, block 1308 transfers to block 1310 which gets the first or next pixel within the row and block 1312 determines whether all pixels have been examined. If a pixel remains to be examined, block 1312 transfers to block 1314 which determines whether the pixel gray scale level is less than the threshold for this cell determined by FIGS. 9 through 12. If the pixel gray scale level is less than the threshold, block 1314 transfers to block 1318 which sets the binary value for the pixel to white or background information. If the gray scale level for the pixel is greater than or equal to the threshold, block 1314 transfers to block 1316 which sets the binary value for the pixel to black or foreground information. After setting the binary value for the pixel, control goes back to block 1310 to get the next pixel. After all pixels in the line have been examined, block 1312 transfers to block 1306 to process the next row within the cell. After all rows have been examined, block 1308 transfers back to block 1302 to examine the next cell within the image and after all cells have been examined and re-scanned, block 1302 returns to FIG. 2 which, in turn, returns to the OCR software 120 of FIG. 1.

Having thus described a presently preferred embodiment of the present invention, it will now be appreciated that the aspects of the invention have been fully achieved, and it will be understood by those skilled in the art that many changes in construction and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

TABLE 1

Gray Scale Levels

Dark Level = 9
Light Level = 7
White Level = 0
First Threshold Level = 4
Run separation Threshold Level = 4

TABLE 2

Predetermined Values

Run Value = 10
Number of Runs = 8 per cell
Number of One Pixel Runs = 8
Number of Two Pixel Runs = 8
Background Variation = 1

What is claimed is:

1. A process for separating text information from background information in a document, said system comprising the steps of:
   - (a) scanning said document to create a scanned image of said document, said scanned image having a gray scale value for each of a plurality of pixels within said document;
   - (b) dividing the document into a plurality of cells;
   - (c) constructing a histogram of said gray scale values of pixels within one of said plurality of cells;
   - (d) determining a number of peaks of said histogram
   - (e) determining a number of each length of dark pixels within said one of said cells;
   - (f) if said histogram contains two peaks and a background peak of said two peaks has a gray scale level equal to or below a determined white level and a number of one dark pixel runs is greater than a predetermined number of one pixel runs value setting a threshold gray scale level for said one of said cells to a predetermined first threshold level;
   - (g) separating said text information from said background information by re-scanning said cell using said threshold gray scale level set in step (e); and
   - (h) repeating steps (c) through (g) for each of said plurality of cells.

2. The process of claim 1 wherein step (f) further comprises the step of:
   - (f1) if said histogram contains two peaks and a background peak of said two peaks has a gray scale level equal to or below a predetermined white level and a number of dark two pixel runs is greater than a predetermined number of two pixel runs value setting a threshold value for said one of said cells to a value equal to one less that a gray scale value of an average run within said one of said cells.

3. The process of claim 1 wherein step (f) further comprises the step of:
   - (f1) if said histogram contains two peaks and a background peak of said two peaks has a gray scale level equal to or below a predetermined white level and a number of one, two and three dark pixel runs is each less than a predetermined run value setting a threshold value for said one of said cells to a level below a gray scale level of a foreground peak of said two peaks.

4. The process of claim 1 wherein step (f) further comprises the step of:
   - (f1) if said histogram contains two peaks and a background peak of said two peaks has a gray scale level equal to or below a predetermined white level and any of a number of one, two and three dark pixel runs is greater than a predetermined run value setting a threshold value for said one of said cells to a level between said gray scale level of said background peak and a gray scale level of a foreground peak of said two peaks.

5. The process of claim 1 wherein step (f) further comprises the step of:
   - (f1) if said histogram contains one peak and a gray scale level of said peak is greater than a predetermined very dark level, setting a threshold value for said one of said cells to a level less than said gray scale level of said peak; and
   - (f2) if said histogram contains one peak and a gray scale level of said peak is less than said predetermined very dark level, setting a threshold level for said one of said cells to a level greater than said gray scale level of said peak.

6. The process of claim 1 wherein step (f) further comprises the steps of:
   - (f1) constructing a plurality of histograms, one for each cell of a predetermined list of neighboring cells, each said histogram being of said gray scale values of pixels within one cell of said predetermined list of neighboring cells;
   - (f2) determining a background peak of each of said plurality of histograms; and
   - (f3) determining a foreground peak of each of said plurality of histograms.

7. The process of claim 6 wherein step (f) further comprises the steps of:
   - (f4) for each one of said cells in said predetermined list of neighboring cells, if said histogram for said cell contains three peaks and a middle of said three peaks has a gray scale level within a value of one of a gray scale level of a background peak of any of said neighboring cells, setting a threshold level for said one of said cells to a level between said middle peak gray scale level and a gray scale level of a foreground peak of said three peaks.

8. The process of claim 6 wherein step (f) further comprises the steps of:
   - (f4) for each one of said cells in said predetermined list of neighboring cells, if said histogram for said cell contains three peaks and a middle of said three peaks has a gray scale level within a value of one of a gray scale level of a foreground peak of any of said neighboring cells, setting a threshold level for said one of said cells to a level between said middle peak gray scale level and a gray scale level of a background peak of said three peaks.

9. The process of claim 6 wherein step (f) further comprises the steps of:
   - (f4) for each one of said cells in said predetermined list of neighboring cells, if said histogram for said cell contains more than three peaks, setting a threshold level for said one of said cells to an average level of a threshold of said neighboring cells.

10. The process of claim 1 wherein step (f) further comprises the steps of:
    - (f1) if said histogram contains three peaks and a difference in gray scale level values between a middle of said three peaks and a foreground peak is less than a difference in gray scale level values between said middle of said three peaks and a background peak, setting a threshold level for said one of said cells to a level between said middle peak gray scale level and a gray scale level of said background peak of said three peaks.

11. The process of claim 1 wherein step (f) further comprises the steps of:
  (f1) if said histogram contains three peaks and a difference in gray scale level values between a middle of said three peaks and a background peak is less than a difference in gray scale level values between said middle of said three peaks and a foreground peak, setting a threshold level for said one of said cells to a level between said middle peak gray scale level and a gray scale level of said foreground peak of said three peaks.

* * * * *